United States Patent
Klings et al.

(10) Patent No.: US 8,176,307 B2
(45) Date of Patent: May 8, 2012

(54) METHOD AND SYSTEM FOR POST-BUILD MODIFICATION OF FIRMWARE BINARIES TO SUPPORT DIFFERENT HARDWARE CONFIGURATIONS

(75) Inventors: Eric Klings, Freehold, NJ (US); Michael Erwin, Columbus, NJ (US)

(73) Assignee: Broadcom Corporation, Irvine, CA (US)

( * ) Notice: Subject to any disclaimer, the term of this patent is extended or adjusted under 35 U.S.C. 154(b) by 415 days.

(21) Appl. No.: 12/546,797

(22) Filed: Aug. 25, 2009

(65) Prior Publication Data
US 2010/0262816 A1    Oct. 14, 2010

Related U.S. Application Data

(60) Provisional application No. 61/168,687, filed on Apr. 13, 2009.

(51) Int. Cl.
*G06F 9/24* (2006.01)
*G06F 9/00* (2006.01)
*G06F 9/44* (2006.01)

(52) U.S. Cl. ............................ 713/1; 713/100; 717/170

(58) Field of Classification Search ............... 713/1, 100
See application file for complete search history.

(56) References Cited

U.S. PATENT DOCUMENTS

| | | | | |
|---|---|---|---|---|
| 7,127,531 | B2 * | 10/2006 | Biggs et al. | 710/5 |
| 7,246,224 | B2 * | 7/2007 | Rothman et al. | 713/1 |
| 7,313,791 | B1 * | 12/2007 | Chen et al. | 717/170 |
| 7,676,800 | B2 * | 3/2010 | Kinney | 717/162 |
| 7,774,596 | B2 * | 8/2010 | Flynn | 713/161 |
| 7,886,138 | B2 * | 2/2011 | Ferlitsch | 713/1 |
| 2009/0119773 | A1 * | 5/2009 | D'Amore et al. | 726/21 |
| 2010/0180265 | A1 * | 7/2010 | Tsai et al. | 717/140 |

* cited by examiner

*Primary Examiner* — Suresh Suryawanshi
(74) *Attorney, Agent, or Firm* — Thomas, Kayden, Horstemeyer & Risley, LLP.

(57) ABSTRACT

A firmware data processing system may be operable to allocate a configuration area in the firmware binary image file for customizable settings. During the firmware build process for the firmware binary image file, default configuration information may be inserted into this configuration area. This default configuration information may be either actual default setting values or indicator to use the default setting values. During post-build modification process, a separately created utility application may be operable to read in the original firmware binary image file, select new settings, and insert new configuration information into the configuration area. The utility application may also be operable to create a new firmware binary image file with reproduced checksums or other error detection mechanisms required for the original firmware binary image file, based on the new configuration information in the configuration area.

20 Claims, 5 Drawing Sheets

METHOD AND SYSTEM FOR POST-BUILD MODIFICATION OF FIRMWARE BINARIES TO SUPPORT DIFFERENT HARDWARE CONFIGURATIONS

CROSS-REFERENCE TO RELATED APPLICATIONS/INCORPORATION BY REFERENCE

This application makes reference to, claims priority to, and claims benefit from U.S. Provisional Application Ser. No. 61/168,687, which was filed on Apr. 13, 2009.

The above stated application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to data processing. More specifically, certain embodiments of the invention relate to a method and system for post-build modification of firmware binaries to support different hardware configurations.

BACKGROUND OF THE INVENTION

Embedded firmware has a large dependency on the hardware environment in which it is being used. There can be a great deal of variance in the type of memory or other components used, board layout, or thermal solutions. Unlike user preferences which can be changed after the firmware is running on a processor, these hardware dependencies may prevent the firmware from functioning in any manner. Generally, the firmware manufacturers create different firmware builds for each different hardware configuration. These builds are all created at the same time by a "build engineer" or by an automated process.

The limitation of the generating different builds in this manner is that these can not be changed or updated easily in the field by a support person. In this regard, a request is generally made to the originator of the firmware builds to make the change. With firmware build teams located all over the world, it may take days if not weeks to be able to make and test a simple change.

Supporting multiple hardware configurations may be done at the original creation of the firmware binary images. However, after the images are created, a new or an updated firmware image may need to be created from scratch to handle a different hardware configuration. A separate user area of flash memory may be allocated for hardware configuration settings. However, under such circumstances, the firmware which needs to be running generally needs to be able to write these settings or an external flash burning tool is required. In addition, since the settings are decoupled from the firmware image, a great deal of care is required to keep the settings and firmware in sync with each other to accommodate firmware changes or updates.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for post-build modification of firmware binaries to support different hardware configurations, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for post-build modification of firmware binaries to support different hardware configurations. In various embodiments of the invention, a firmware data processing system may be operable to allocate a configuration area in the firmware binary image file for customizable settings. During the firmware build process for the firmware binary image file, default configuration information may be inserted into this configuration area. This default configuration information may be either actual default setting values or one or more indicators or place holders to use the default setting values. The firmware data processing system may be operable to create firmware binary image file, based on the default configuration information in the configuration area. During post-build modification process for firmware changes and/or updates, a separately created utility application may be operable to read in the original firmware binary image file, select new settings, and insert new configuration information into the configuration area. This new configuration information may be either actual new setting values or indicator or place holder to use the new setting values. The separately created utility application may also be operable to create a new firmware binary image file with reproduced checksums or other error detection mechanisms required for the original firmware image file, based on the new configuration information in the configuration area.

Figure 1:
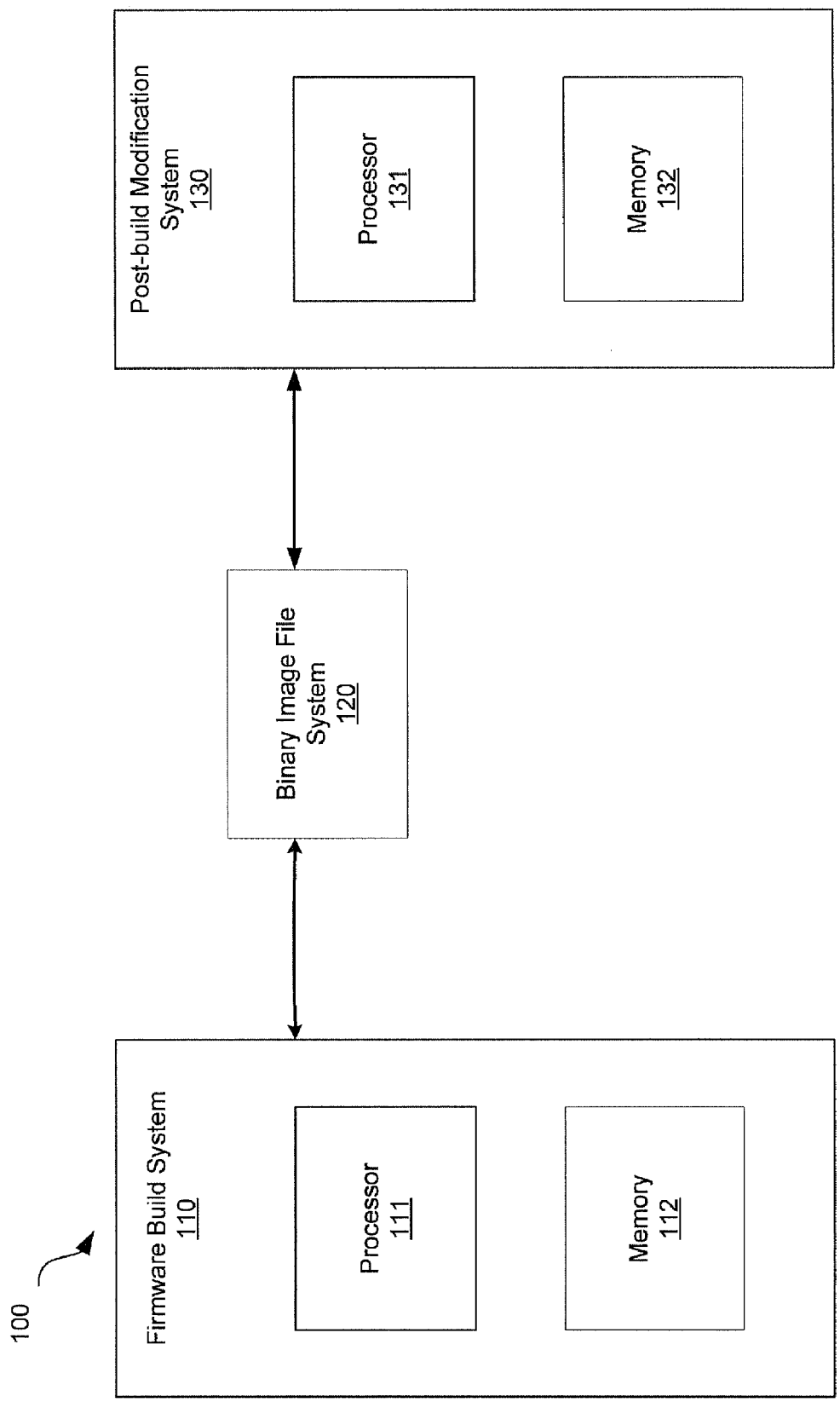
FIG. 1 is a block diagram illustrating an exemplary system that is operable to provide post-build modification of firmware binaries to support different hardware configurations, in accordance with an embodiment of the invention.

FIG. 1 is a block diagram illustrating an exemplary system that is operable to provide post-build modification of firmware binaries to support different hardware configurations, in accordance with an embodiment of the invention. Referring to FIG. 1, there is shown a system 100. The system 100 may comprise a firmware build system 110, a binary image file system 120, and a post-build modification system 130. The firmware build system 110 may comprise a processor 111 and a memory 112. The post-build modification system 130 may comprise a processor 131 and a memory 132.

The firmware build system 110 may comprise suitable logic, circuitry, interfaces and/or code that may be operable to create firmware binary image files during firmware build process. The processor 111 may comprise suitable logic, circuitry, interfaces and/or code that may be operable to communicate with the memory 112 to provide various firmware build algorithms for various operations during the firmware build process. The processor 111 may be operable to allocate a configuration area in the firmware binary image file. The processor 111 may be operable to insert default configuration information into the configuration area during firmware build process. In an exemplary embodiment of the invention, the configuration information may comprise either the actual default setting values or an indicator or place holder to use the default setting values. The processor 111 may be operable to create firmware binary image file, based on the default configuration information in the configuration area of the firmware binary image file. The processor 111 may be operable to communicate with the binary image file system 120 to store newly created firmware binary image files. The processor 111 may also be operable to create a utility application which may be utilized by the post-build modification system 130 for firmware changes and/or updates.

The memory 112 may comprise suitable logic, circuitry, interfaces and/or code that may be operable to store information such as executable instructions and data that may be utilized by the processor 111. The executable instructions may comprise firmware build algorithms that may be utilized by the processor 111 during firmware build process. The data may comprise, for example, firmware source codes, firmware binary image files, and utility application that may be read, written and/or created by the processor 111.

The binary image file system 120 may comprise suitable logic, circuitry, interfaces and/or code that may be operable to store firmware binary image files created by the firmware build system 110 for dispatching and/or uploading into, for example, a circuit board or other firmware devices. The binary image file system 120 may also be operable to store firmware binary image files changed and/or updated by the post-build modification system 130 for dispatching and/or uploading into, for example, a circuit board or other firmware devices.

The post-build modification system 130 may comprise suitable logic, circuitry, interfaces and/or code that may be operable to create new or updated firmware binary image files during post-build modification process for firmware changes and/or updates. The processor 131 may comprise suitable logic, circuitry, interfaces and/or code that may be operable to communicate with the memory 132 to provide various firmware changes and/or updates and utility application algorithms for various operations during post-build modification process for firmware changes and/or updates. The firmware change and/or updates may be needed due to hardware configuration change such as, for example, different memory type, board layout, and thermal solutions. The processor 131 may be operable to execute the utility application to read in a firmware binary image file stored in the binary image file system 120, during post-build modification process for firmware change and/or update. The processor 131 may be operable to execute the utility application to select new setting values for firmware changes and/or updates. The processor 131 may be operable to execute the utility application to insert new configuration information into the configuration area during post-build modification process. In an exemplary embodiment of the invention, the new configuration information may comprise either the actual new setting values or an indicator or place holder to use the new setting values. The processor 131 may be operable to execute the utility application to create new firmware binary image file with reproduced checksums or other error detection mechanisms required for the original firmware binary image file, based on the new configuration information in the configuration area of the firmware binary image file. The processor 131 may also be operable to communicate with the binary image file system 120 to store newly changed and/or updated firmware binary image files.

The memory 132 may comprise suitable logic, circuitry, interfaces and/or code that may be operable to store information such as executable instructions and data that may be utilized by the processor 131. The executable instructions may comprise firmware changes and/or updates and the utility application algorithms that may be utilized by the processor 131 during post-build modification process for firmware changes and/or updates. The data may comprise, for example, original firmware binary image files and changed and/or updated firmware binary image files that may be read, written and/or created by the processor 131.

In operation, the processor 111 may allocate a configuration area in the firmware binary image file. During firmware build process, the processor 111 may insert the default configuration information, for example, the actual default setting values or an indicator or place holder to use the default setting values, into the configuration area. The processor 111 may create the firmware binary image file based on the default configuration information in the configure area of the firmware binary image file. A utility application may also be created which may be utilized for firmware changes and/or updates. The firmware binary image file created by the processor 111 may be stored in the binary image file system 120 for dispatching and/or uploading into firmware devices. During post-build modification process for firmware changes and/or updates, the processor 131 may be operable to execute the utility application to read in the original firmware binary image file stored in the binary image file system 120. The processor 131 may execute the utility application to select new setting values for firmware changes and/or updates. The processor 131 may execute the utility application to insert new configuration information, for example, the actual new setting values or an indicator or place holder to use the new setting values, into the configuration area of the firmware binary image file. The processor 131 may execute the utility application to create the new firmware binary image file with reproduced checksums or other error detection mechanisms required for the original firmware binary image file based on the new configuration information in the configuration area of the firmware binary image file. The changed and/or updated firmware binary image file may be stored in the binary image file system 120 for dispatching and/or uploading into one more devices, for example as a firmware update.

Figure 2:
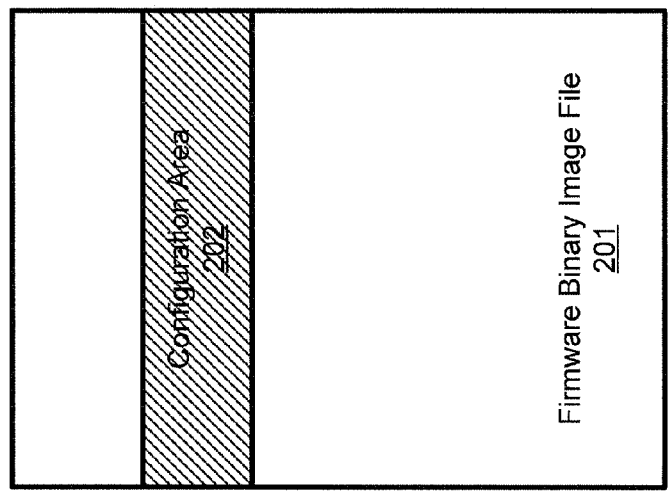
FIG. 2 is a block diagram illustrating an exemplary insertion of placeholder for configuration settings during the firmware build process, in accordance with an embodiment of the invention.

FIG. 2 is a block diagram illustrating an exemplary insertion of placeholder for configuration settings during the firmware build process, in accordance with an embodiment of the invention. Referring to FIG. 2, there is shown a firmware binary image file 201 and a configuration area 202.

The firmware binary image file 201 may be, for example, a "dot bin" file created during firmware build process. The configuration area 202 may be a section in the firmware binary image file 201 allocated as a placeholder for configuration information. The configuration area 202 may be allocated anywhere in the firmware binary image file 201, for example, close to the beginning of the firmware binary image file 201. During firmware build process, configuration information, such as the default configuration information, may be inserted into the configuration area 202. The default configuration information may comprise either the actual default setting values or indicator to use the default setting values. In this regard, the configuration settings are coupled together in the same binary image file so that there may be no chance of having versions of the two which are mismatched.

In operation, the processor 111 described with respect to FIG. 1 may be configured to allocate a configuration area 202 in the firmware binary image file 201. During build process, the processor 111 may be operable to insert the default configuration information, for example, the actual default setting values or an indicator or place holder to use the default setting values, into the configuration area 202. The processor 111 may be operable to create the firmware binary image file 201 based on the default configuration information in the configuration area 202.

Figure 3:
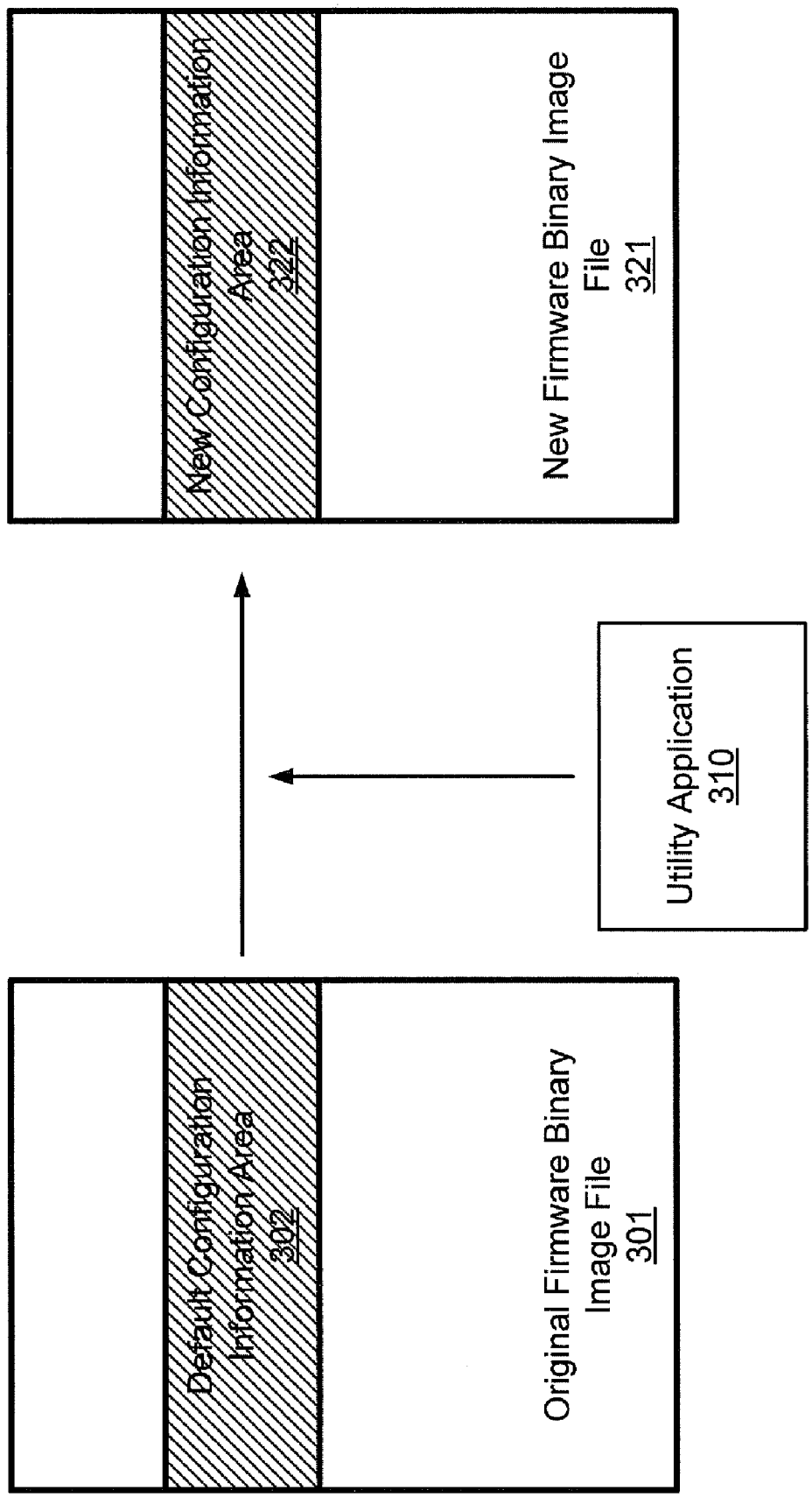
FIG. 3 is a block diagram illustrating an exemplary creation of a new firmware binary image with new configuration settings, in accordance with an embodiment of the invention.

FIG. 3 is a block diagram illustrating an exemplary creation of a new firmware binary image with new configuration settings, in accordance with an embodiment of the invention. Referring to FIG. 3, there in shown an original firmware binary image file 301, a default configuration information area 302, a utility application 310, a new firmware binary image file 321, and a new configuration information area 322.

The default configuration information area 302 may be a configuration area 202, which is described with respect to, for example FIG. 2, in which the default configuration information is loaded or inserted during the firmware build process. The default configuration information may comprise either the actual default setting values or indicator or place holder to use the default values. The original firmware binary image file 301 may be, for example, a "dot bin" file created during firmware build process based on the default configuration information in the default configuration information area 302. The utility application 310 may be, for example, a Windows utility, a Mac utility, a Linux utility, or other application. The utility application 310 may be created during firmware build process for the purpose of firmware changes and/or updates. The new configuration information area 322 may be a configuration area 202, which is described with respect to FIG. 2, in which the new configuration information is loaded or inserted by executing the utility application 310 during post-build modification process. The new configuration information area 322 may comprise either the actual new setting values or indicator or place holder to use the new setting values for firmware changes and/or updates. The new firmware binary image file 321 may be, for example, a "dot bin" file created by executing the utility application 310 during post-build modification process for firmware changes and/or updates, based on the new configuration information in the new configuration information area 322. In this regard, firmware binary image file 301 may be changed and/or updated easily in the field for a hardware configuration using the available utility application 310 without a request to the originator of the firmware build.

In operation, the utility application 310 may be executed during post-build modification process to read in the original firmware binary image file 301, select new settings, and insert new configuration information corresponding to these new settings into the new configuration information area 322. The utility application 310 may also be executed to create new firmware binary image file 321 with reproduced checksums or other error detection mechanisms required for the original firmware binary image file 301, based on the new configuration information in the new configuration information area 322.

Figure 4:
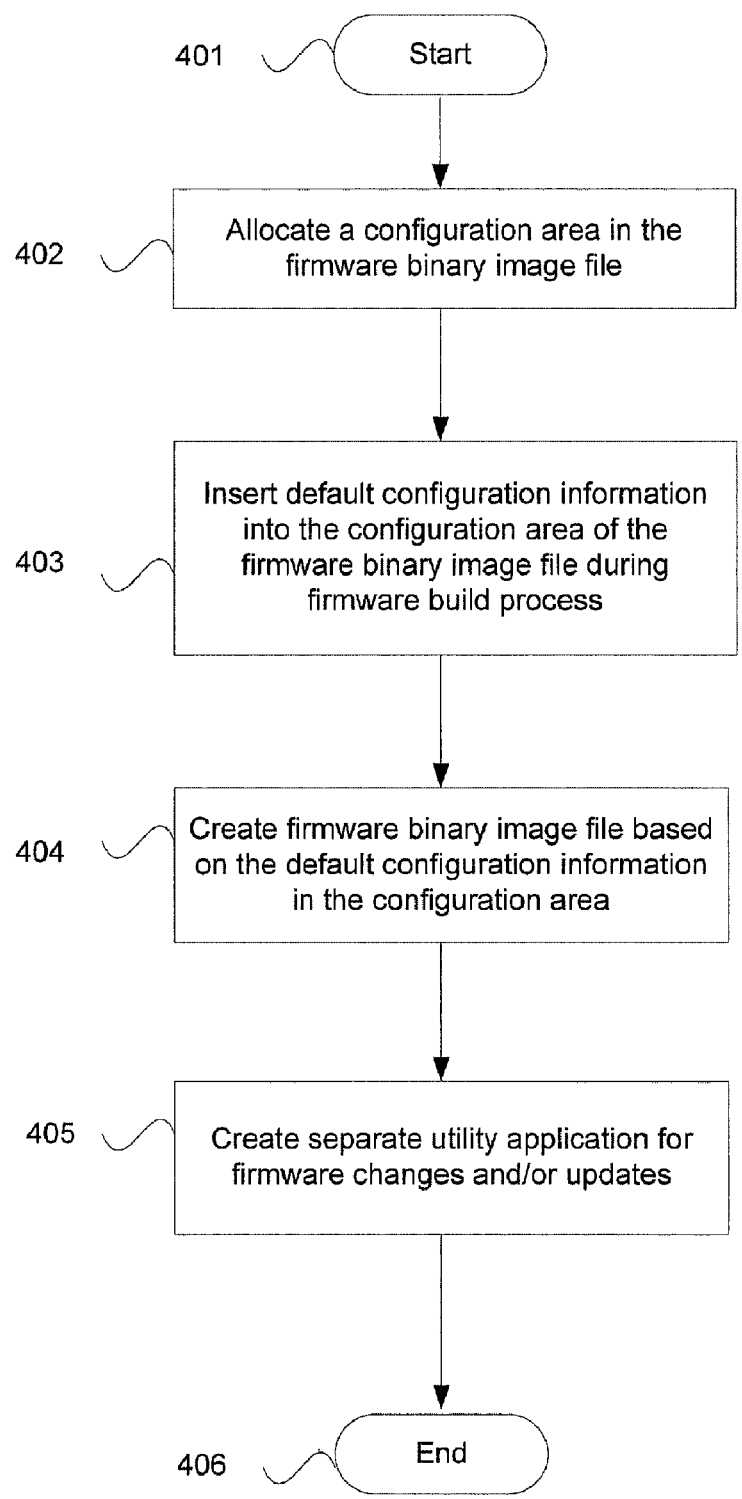
FIG. 4 is a flow chart illustrating exemplary steps for firmware build of firmware binary image file, in accordance with an embodiment of the invention.

FIG. 4 is a flow chart illustrating exemplary steps for firmware build of firmware binary image file, in accordance with an embodiment of the invention. Referring to FIG. 4, in step 402 after start step 401, the firmware build system 110 may be operable to allocate a configuration area in the firmware binary image file. In step 403, the firmware build system 110 may be operable to insert default configuration information into the configuration area of the firm binary image file during firmware build process. In step 404, the firmware build system 110 may be operable to create firmware binary image file based on the configuration information in the configuration area. In step 405, a separate utility application may be created for firmware changes and/or updates. The exemplary steps may proceed to the end step 406.

Figure 5:
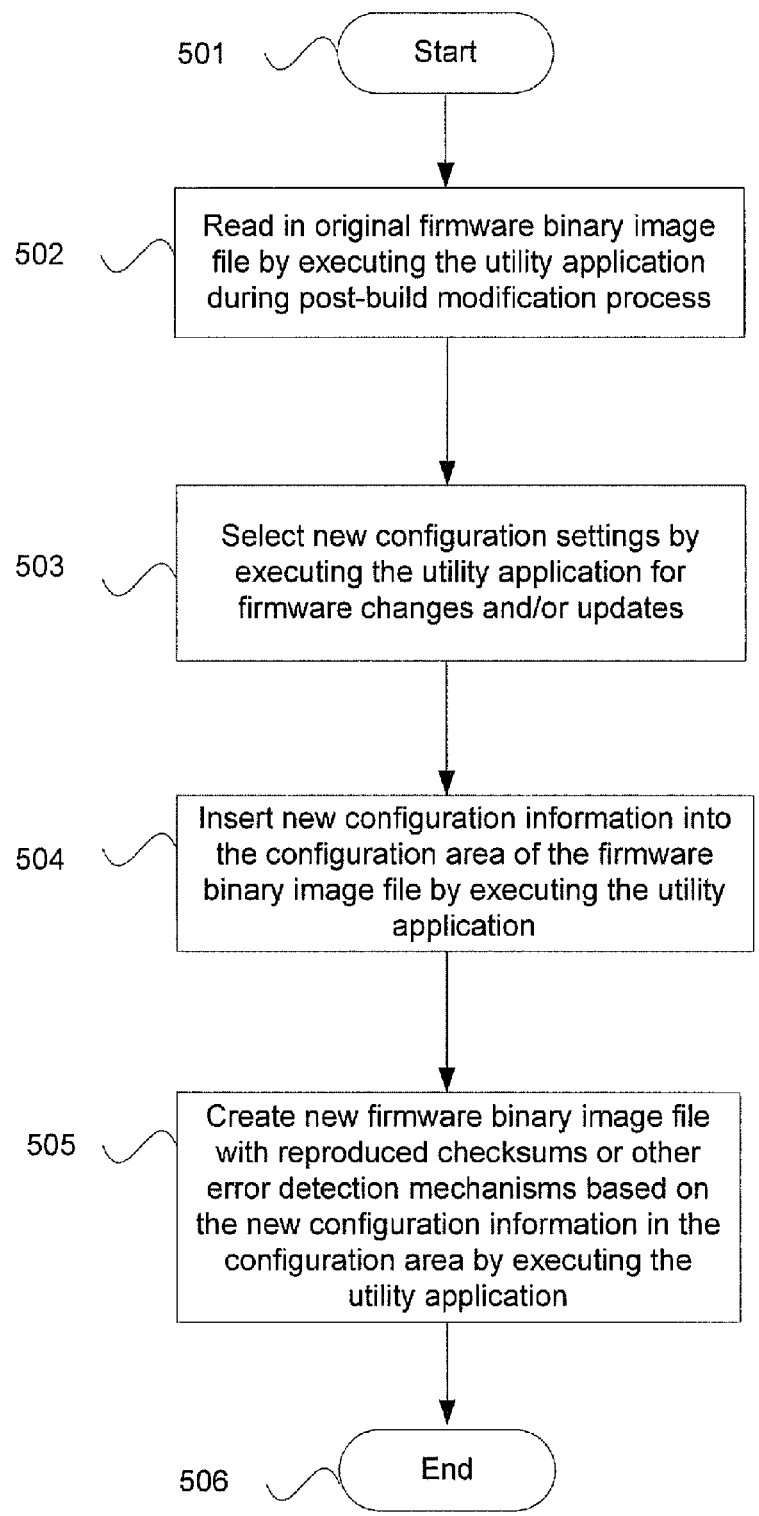
FIG. 5 is a flow chart illustrating exemplary steps for post-build modification of firmware binary image file, in accordance with an embodiment of the invention.

FIG. 5 is a flow chart illustrating exemplary steps for post-build modification of firmware binary image file, in accordance with an embodiment of the invention. Referring to FIG. 5, in step 502 after start step 501, the post-build modification system 130 may be operable to read in original firmware binary image file by executing the utility application during post-build modification process. In step 503, the post-build modification system 130 may be operable to select new configuration settings by executing the utility application for firmware changes and/or updates. In step 504, the post-build modification system 130 may be operable to insert new configuration information into the configuration area of the firmware binary image file, by executing the utility application. In step 505, the post-build modification system 130 may be operable to create new firmware binary image file with reproduced checksums or other error detection mechanisms based on the new configuration information in the configuration area by executing the utility application. The exemplary steps may proceed to the end step 506.

In various embodiments of the invention, a firmware data processing system 100 may be operable to allocate a configuration area 202 in the firmware binary image file 201 for customizable settings. During the firmware build process for the firmware binary image file 201, default configuration information may be inserted into this configuration area 202. This default configuration information may be either actual default setting values or indicator to use the default setting values. The firmware data processing system 100 may be operable to create firmware binary image file 301, based on the default configuration information in the configuration area 302. During post-build modification process for firmware changes and/or updates, a separately created utility application 310 may be operable to read in the original firmware binary image file 301, select new settings, and insert new configuration information into the configuration area 322. This new configuration information may be either actual new setting values or indicator to use the new setting values. The separately created utility application 310 may also be operable to create a new firmware binary image file 321 with reproduced checksums or other error detection mechanisms required for the original firmware image file 301, based on the new configuration information in the configuration area 322.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for post-build modification of firmware binaries to support different hardware configurations.

Accordingly, the present invention may be realized in hardware, software, or a combination thereof. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for data processing, the method comprising:
   in a firmware data processing system:
   allocating a configuration area in a firmware binary image file;
   inserting a default configuration information into said configuration area during firmware build process; and,
   creating a firmware binary image file based on said default configuration information in said configuration area.

2. The method according to claim 1, wherein said default configuration information comprises actual default setting values.

3. The method according to claim 1, wherein said default configuration information comprises an indicator to use said default setting values.

4. The method according to claim 1, comprising creating a separate utility application for firmware changes and/or updates.

5. The method according to claim 4, wherein said utility application is operable to read in said original firmware binary image file during post-build modification process for firmware changes and/or updates.

6. The method according to claim 4, wherein said utility application is operable to select new setting values during post-build modification process for firmware changes and/or updates.

7. The method according to claim 4, wherein said utility application is operable to insert a new configuration information into said configuration area during post-build modification process for firmware changes and/or updates.

8. The method according to claim 7, wherein said new configuration information comprises new setting values.

9. The method according to claim 7, wherein said new configuration information comprises an indicator to use new setting values.

10. The method according to claim 4, wherein said utility application is operable to create a new firm binary image file with reproduced checksums or other error detection mechanisms required for said original firmware binary image file based on said new configuration information in said configuration area during post-build modification process for firmware changes and/or updates.

11. A system for data processing, the system comprising:
   one or more processors and/or circuits for use in a firmware data processing system, wherein said one or more processors and/or circuits are operable to:
   allocate a configuration area in a firmware binary image file;
   insert a default configuration information into said configuration area during firmware build process; and
   create a firmware binary image file based on said default configuration information in said configuration area.

12. The system according to claim 11, wherein said default configuration information comprises actual default setting values.

13. The system according to claim 11, wherein said default configuration information comprises an indicator to use said default setting values.

14. The system according to claim 11, wherein said one or more processors and/or circuits are operable to create a separate utility application for firmware changes and/or updates.

15. The system according to claim 14, wherein said utility application is operable to read in said original firmware binary image file during post-build modification process for firmware changes and/or updates.

16. The system according to claim 14, wherein said utility application is operable to select new setting values during post-build modification process for firmware changes and/or updates.

17. The system according to claim 14, wherein said utility application is operable to insert a new configuration information into said configuration area during post-build modification process for firmware changes and/or updates.

18. The system according to claim 17, wherein said new configuration information comprises new setting values.

19. The system according to claim 17, wherein said new configuration information comprises an indicator to use new setting values.

20. The system according to claim 17, wherein said utility application is operable to create new firm binary image file with reproduced checksums or other error detection mechanisms required for said original firmware binary image file based on said new configuration information in said configuration area during post-build modification process for firmware changes and/or updates.

* * * * *

UNITED STATES PATENT AND TRADEMARK OFFICE
CERTIFICATE OF CORRECTION

PATENT NO. : 8,176,307 B2
APPLICATION NO. : 12/546797
DATED : May 8, 2012
INVENTOR(S) : Erick Klings and Michael Erwin Page 1 of 1

It is certified that error appears in the above-identified patent and that said Letters Patent is hereby corrected as shown below:

In the Claims

Claim 20, Column 8, line 58, after "create" insert --a--.

Signed and Sealed this
First Day of October, 2013

Teresa Stanek Rea
*Deputy Director of the United States Patent and Trademark Office*